(12) United States Patent
Zheng et al.

(10) Patent No.: US 11,316,610 B2
(45) Date of Patent: Apr. 26, 2022

(54) SYSTEMS AND METHODS FOR BEAMFORMING

(71) Applicant: Facebook Technologies, LLC, Menlo Park, CA (US)

(72) Inventors: Dong Zheng, Saratoga, CA (US); Yuting Fan, Redmond, WA (US); Qi Qu, Redmond, WA (US); Gang Lu, Pleasanton, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 148 days.

(21) Appl. No.: 16/752,079

(22) Filed: Jan. 24, 2020

(65) Prior Publication Data

US 2020/0287653 A1 Sep. 10, 2020

Related U.S. Application Data

(60) Provisional application No. 62/815,839, filed on Mar. 8, 2019.

(51) Int. Cl.
*H04L 1/00* (2006.01)
*G02B 27/01* (2006.01)
(Continued)

(52) U.S. Cl.
CPC .......... *H04L 1/0003* (2013.01); *G02B 27/017* (2013.01); *H04L 1/0009* (2013.01);
(Continued)

(58) Field of Classification Search
None
See application file for complete search history.

(56) References Cited

U.S. PATENT DOCUMENTS 9,866,286 B1 1/2018 Qu et al.
2015/0350974 A1* 12/2015 Patil ...................... H04W 28/08
370/331

(Continued)

FOREIGN PATENT DOCUMENTS

WO WO-2018/125686 A2 7/2018

OTHER PUBLICATIONS

International Search Report and Written Opinion for PCT/US2020/021086 dated May 26, 2020; 15 pgs.

*Primary Examiner* — Scott M Sciacca
(74) *Attorney, Agent, or Firm* — Foley & Lardner LLP

(57) ABSTRACT

Systems and methods for beamforming include a device including at least one of a head wearable display (HWD) or a console. The device establishes a first connection between an active HWD radio-frequency integrated circuit (RFIC) and an active console RFIC. The device compares a modulation and coding scheme (MCS) of the first connection to an MCS threshold. The device performs MCS measurements for a second connection of at least one of an idle HWD RFIC or an idle console RFIC, while the first connection is maintained, in response to the MCS not satisfying the MCS threshold. The device compares the MCS measurements of the second connection to the MCS threshold. The device switches to the second connection when at least one of the one or more MCS measurements satisfies the MCS threshold and/or above the MCS of the first connection.

20 Claims, 11 Drawing Sheets

(51) Int. Cl.
    *H04W 24/10*   (2009.01)
    *H04L 1/20*    (2006.01)

(52) U.S. Cl.
    CPC .......... *H04L 1/0015* (2013.01); *H04L 1/0026* (2013.01); *H04L 1/20* (2013.01); *H04W 24/10* (2013.01)

(56) References Cited

U.S. PATENT DOCUMENTS

2018/0278309 A1    9/2018  Raghavan et al.
2019/0182702 A1*   6/2019  Wang ................ H04W 28/0221
2020/0112354 A1*   4/2020  Chigusa .................. A63F 13/26

* cited by examiner

SYSTEMS AND METHODS FOR BEAMFORMING

CROSS-REFERENCE TO RELATED APPLICATION

This application claims priority to U.S. Provisional Patent Application No. 62/815,839, filed Mar. 8, 2019, which is incorporated by reference in its entirety for all purposes.

FIELD OF DISCLOSURE

The present disclosure is generally related to communication for rendering artificial reality, including but not limited to reducing channel degradation in wireless communication for artificial reality.

BACKGROUND

Artificial reality such as a virtual reality (VR), an augmented reality (AR), or a mixed reality (MR) provides an immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

Due to head movements, which are typical in artificial reality experiences, the console and HWD may leverage beamforming between active (e.g., serving) radio-frequency integrated circuits (RFICs) on the console and the HWD to maintain satisfactory link performance between the console and HWD. Beamforming may be performed by using segment level sweep (SLS), beam refinement (BRP), and/or tracking (BT) protocol(s). However, performing beamforming at a start of each system interval (e.g., an active period for beamforming and data burst followed by a relatively large sleep duration) may be costly. Furthermore, in some implementations, the HWD and/or the console may include a plurality of RFICs, some of which may be active, and some of which may be idle (e.g., inactive, or non-serving).

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses systems and methods for beamforming; and

Section C discloses a computing system which may be usable to implement aspects of the present disclosure.

A. Artificial Reality System

Figure 1:
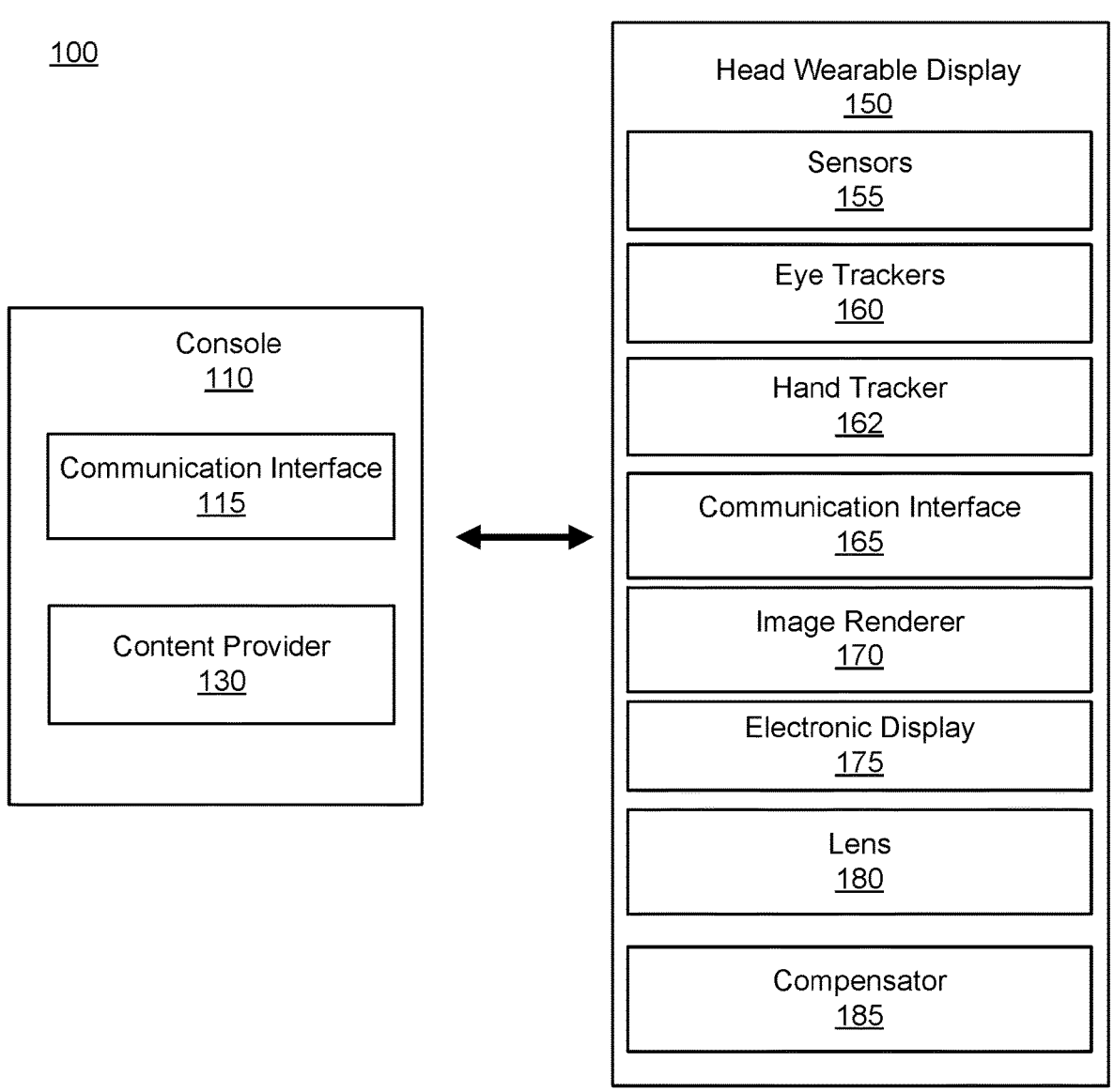
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
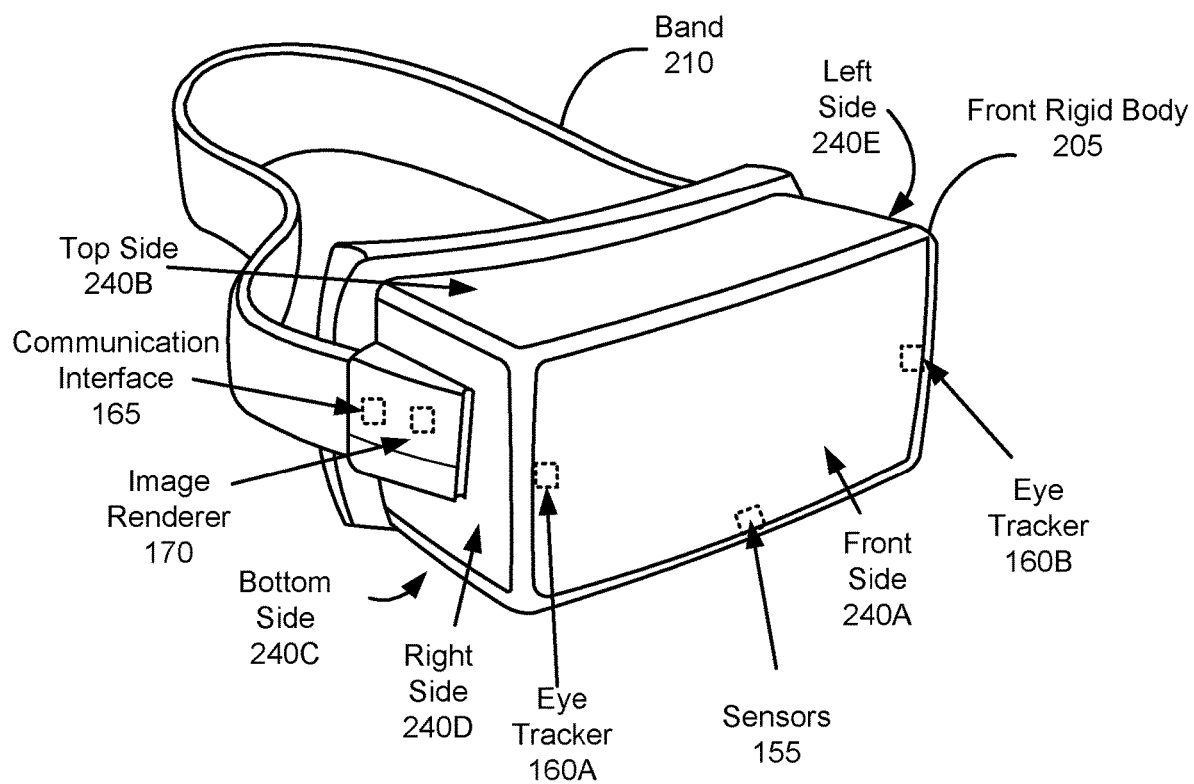
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150. Similarly, the console 110 and HWD 150 may dynamically and intelligently switch between active and idle communications interface(s) 115, 165 to optimize the communications channel between the console 110 and HWD 150.

B. Systems and Methods for Beamforming

Systems and methods for beamforming are described herein. The systems and methods described herein may be implemented in a device which includes at least one component, element, or aspect of the artificial reality system described in section A. For instance, the systems and methods described herein may be implemented within the console 110, the HWD 150, etc. In some instances, transmissions between the HWD 150 and the console 110 are in periodic system intervals during which an active period (for beamforming and data burst) is followed by a large sleep duration. Utilizing a 60 Ghz solution, beamforming may be used to compensate for path loss to maintain good link performance. Beam forming (BF) is performed by using segment level sweep (SLS), beam refinement (BRP), and/or tracking (BT) protocol. Due to head movement that is expected to be frequent or continuous in artificial reality (e.g., augmented reality (AR), virtual reality (VR), or mixed reality (MR) applications, where BF is used to track the best beams between the HWD 150 and console 110. However, it may be costly from a power consumption standpoint to run BF at the start of each system interval. Moreover, for multiple radio-frequency integrated circuits (RFICs) on the HWD 150 or console 110, it may be beneficial to intelligently and dynamically select one RFIC to be active to save power.

Where multiple RFICs are included in the HWD 150 and/or in the console 110, RFIC selection (e.g., for the HWD 150 and/or console 110) may be done in the initial BF and association procedure. After that, one RFIC for the HWD 150 and one RFIC for the console 110 are in active transmission (serving) mode, and it may be desirable to save power by putting the other ones in sleep mode as long as possible. Due to mobility in artificial reality applications, the current serving RFIC may not always have a better channel than others. However, unnecessarily bringing up an idle RFIC to search for a better channel can increase power consumption, and may not yield much gain when the serving RFIC is seeing a good channel, for instance. However, delaying to bring up the idle RFIC to search for a possible better channel could result in link loss and/or degraded user experience in the current channel.

The present disclosure includes embodiments of a system and a method for switching between serving and idle RFICs, which can provide a tradeoff between power consumption and user experience, and can use criteria to trigger measurement and criteria to trigger switching. For instance, if the current channel condition is unsatisfactory (e.g., current MCS is less than a MCS threshold), then measurement may be triggered on an idle RFIC to perform periodic BF, for instance. The periodic measurement can be stopped when the current MCS is above the threshold, or a switch between RFICs has happened. And if the idle RFIC has better performance (e.g., better MCS than the current one, beyond a hysteresis margin), switching can be triggered.

In some respects, because a channel could degrade significantly during a sleep duration that extends over tens of milliseconds, the present solution can for instance use four beam tracking and an initial handshake with BRP packets. Based on measurements, it is statistically determined that channels changes at most 1 dB/500 us, or roughly one MCS level change per 500 us. Therefore, based on the channel condition (e.g., MCS) and corresponding transmit time, the number or degree of MCS change can be estimated during the transmission. Accordingly, in one embodiment, the BF strategy provides that, for a given MCS, BT may be selectively performed and for various times during data transmission. For example, and in some embodiments, for data transmission at MCS 8+ (e.g., 8 or higher), no BT may be performed; for MCS 4-7, only one BT may performed in the middle of data transmission, e.g., in the 3rd packet; for MCS 2-3, BT may be performed twice during the data transmission, e.g., in 2nd and 4th packet; and for MCS 1, BT may performed 5 times (e.g., BT may be performed for every packet).

According to the embodiments and aspects described herein, the artificial reality device and corresponding systems, and methods may dynamically switch between serving and non-serving RFICs to balance between channel optimization and reducing power consumption. The systems and methods described herein may leverage a current channel condition (such as MCS) to selectively perform beamforming to further balance between channel optimization and reducing power consumption. The systems and methods described herein may reduce overall power consumption while still delivering optimized channel conditions through dynamic performance of beamforming and RFIC switching. Various other benefits and advantages are disclosed below.

Figure 3A:
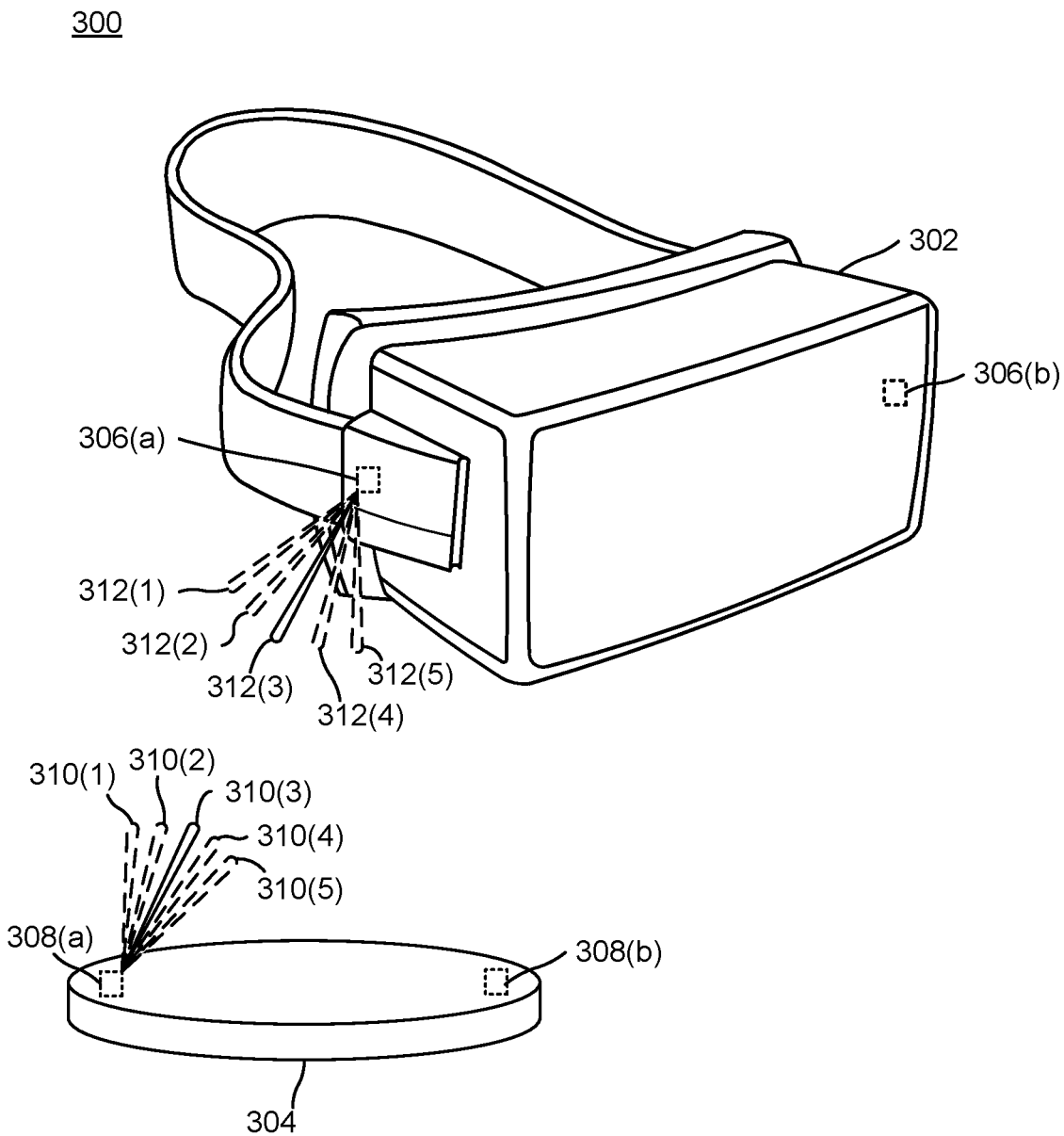
FIG. 3A through FIG. 3C are diagrams of the system environment of FIG. 1 including beams between the head mounted display and the console, according to an example implementation of the present disclosure.
Figure 3B:
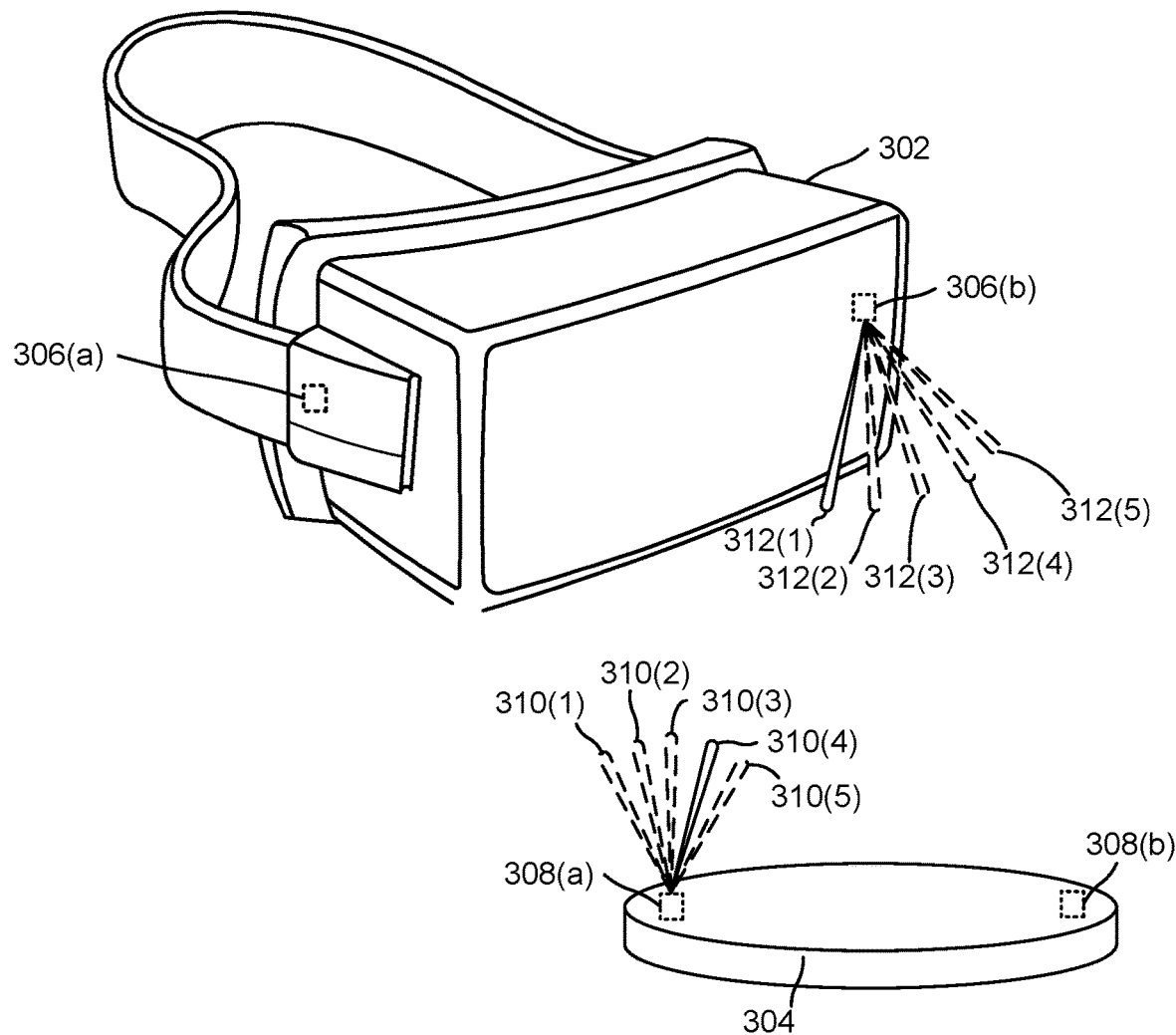
Figure 3C:
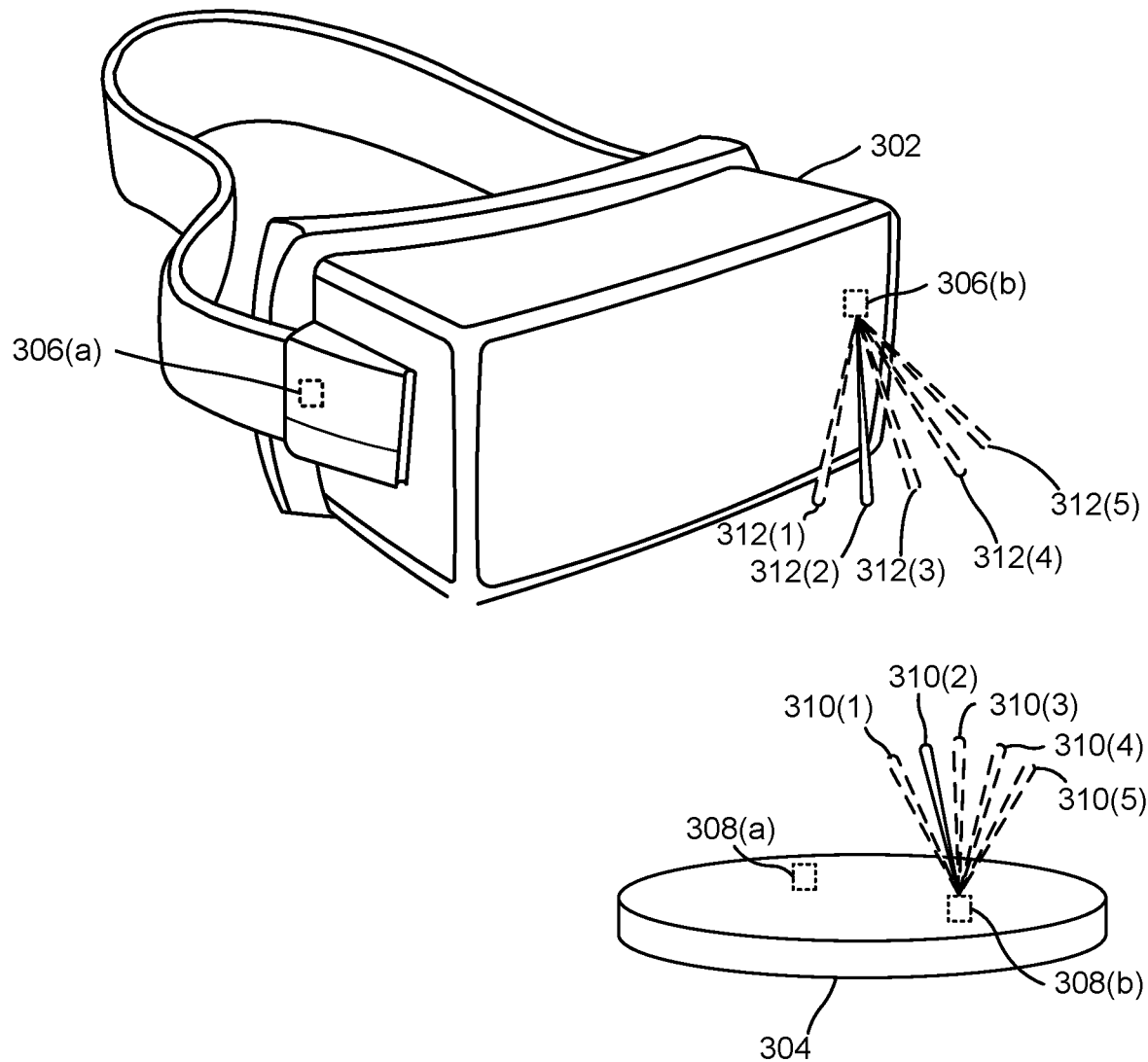

Referring now to FIG. 3A-FIG. 3C, a device 300 for beamforming is shown, according to an illustrative embodiment. The device 300 may include a head wearable display (HWD) 302 and/or a console 304. The HWD 302 may include one or more radio-frequency integrated circuits (RFICs) 306a, 306b (also referred to as "HWD RFIC"). Similarly, the console 304 may include one or more RFICs 308a, 308b (also referred to as "console RFIC"). As described in greater detail below, the device 300 may be configured to establish a first connection between an active HWD RFIC 306 (e.g., HWD RFIC that is active) and an active console RFIC 308. The device 300 may be configured to compare a modulation and coding scheme (MCS) of the first connection to an MCS threshold. The device 300 may be configured to establish and perform one or more MCS measurements for a second connection of one of the idle RFICs 306, 308 (e.g., RFICs that are idle) while the first connection is maintained when the MCS of the first connection does not satisfy the MCS threshold. The device 300 may be configured to compare the one or more MCS measurements of the second connection to the MCS threshold. The device 300 may be configured to switch to the second connection when at least one of the MCS measurements satisfies the MCS threshold.

The HWD 302 may be similar in some aspects to the HWD 150 shown in FIG. 1 and FIG. 2 and described in section A. Similarly, the console 304 may be similar in some aspects to the console 110 shown in FIG. 1 and described in section A. The HWD RFICs 306 may be a component or aspect of the communication interface 165, and the console RFICs 308 may be a component or aspect of the communication interface 115. As described in greater detail below, an HWD RFIC 306 and console RFIC 308 may be configured to communicate or exchange (or facilitate the exchange of) data between the HWD 302 and console 304. The RFICs 306, 308 may be any device, component, or circuit designed or implemented to direct, send, or otherwise transmit data in a direction, e.g., between the HWD 302 and console 304.

Figure 4:
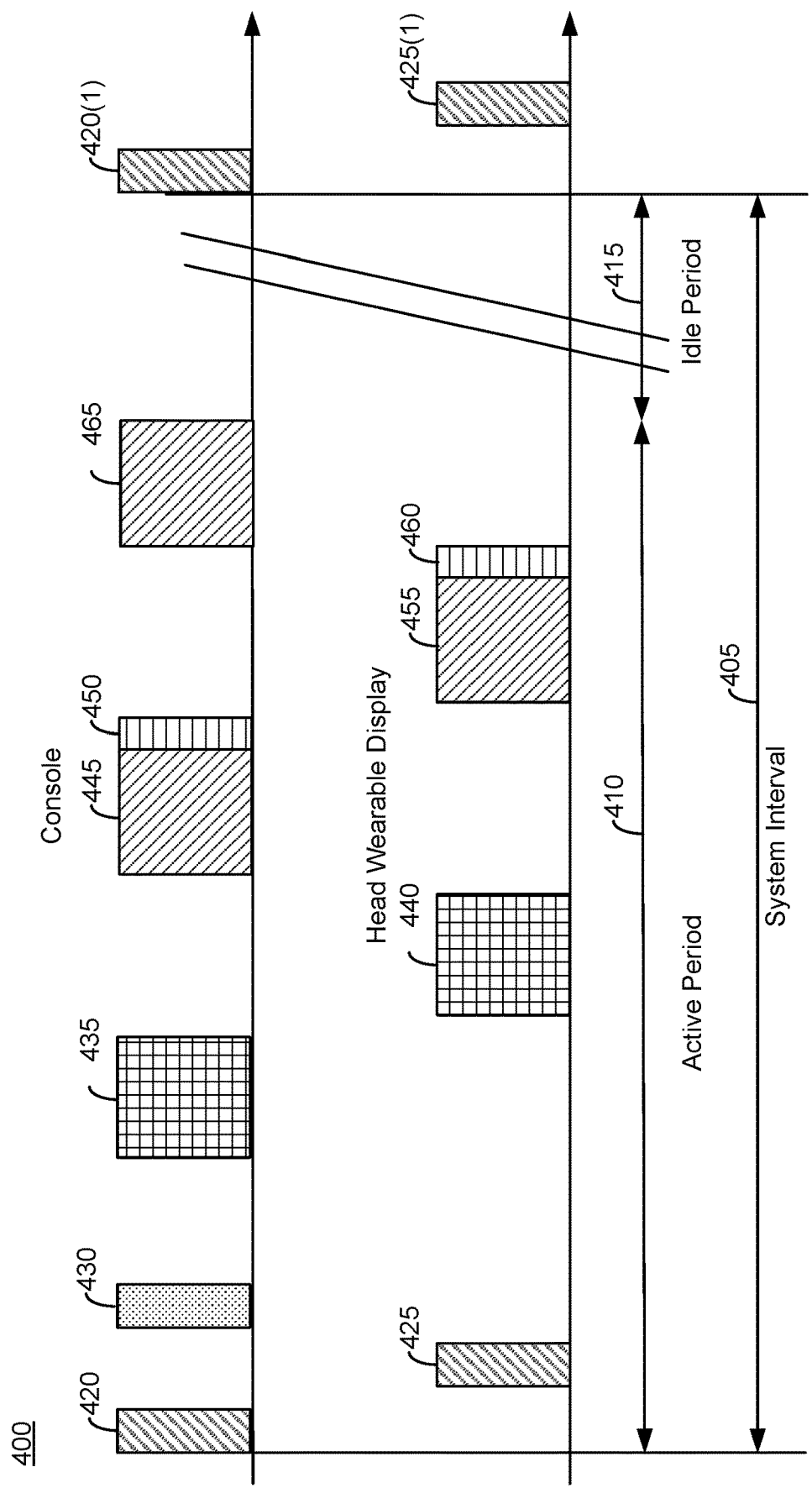
FIG. 4 is an example timing diagram of communication between the head mounted display and the console, according to an example implementation of the present disclosure.

Referring now to FIG. 4, depicted is an example timing diagram 400 of communication between the HWD 302 and the console 304, according to an example implementation of the present disclosure. The timing diagram 400 shows a system interval 405 including an active period 410 and an idle period 415. A duration of the idle period 415 may be approximately 10 ms. A duration of the active period 410 may be between 0.5 ms and 3 ms. In some implementations, the duration of the active period 410 may depend on a channel condition (e.g., an MCS) of the channel between the HWD 302 and the console 304. For instance, where the channel condition shows a strong connection between the HWD 302 and the console 304 (e.g., a high MCS), the active period 410 may be closer to 0.5 ms, whereas where the channel condition shows a degraded connection between the HWD 302 and the console 304 (e.g., a low MCS), the active period 410 may be closer to 3 ms.

Referring now to FIG. 3A through FIG. 4, at the start of a system interval 405 during the active period 410, the console 304 may be configured to implement, execute, or otherwise perform a beam refinement protocol (BRP) (shown as block 420) to identify from a plurality of beams 310(1)-310(5), an active beam 310 (shown in solid in FIG. 3A-FIG. 3C) for an active console RFIC 308a. The console 304 may be configured to perform BRP following the idle period 415, as the channel may degrade following a 10 ms idle period (since a user may move their head and correspondingly the HWD 302, move the console 304, etc.). In some embodiments, the console 304 may be configured to perform segment level sweep (SLS) and BRP on both RFICs 308a, 308b to determine which RFIC 308 is to serve the channel between the console 304 and HWD 302. The console 304 may be configured to perform BRP during an initial handshake for the console 304. In the example shown in FIG. 3A-FIG. 3C, the HWD 302 and console 304 use five beams for performing BRP. However, the device 300 may use any number of beams for performing BRP.

The HWD 302 may be configured to perform BRP (shown as block 425) following the console 304 performing BRP. The HWD 302 may be configured to perform BRP to identify, from a plurality of beams 312(1)-312(5), an active beam 312 (shown in solid in FIG. 3A-FIG. 3C) for an active console RFIC 308a. Similar to the console 304, the HWD 302 may be configured to perform SLS and BRP on both RFICs 306a, 306b to identify which RFIC 306 is to serve the channel between the console 304 and the HWD 302. The HWD 302 may be configured to provide feedback (shown as block 430) to the console 304. In some embodiments, the HWD 302 may be configured to select an active HWD RFIC 306a, 306b which is to serve the channel between the HWD 302 and the console 304, and select an active beam 312 for the active HWD RFIC 306 while generating feedback corresponding to an MCS of the channel corresponding to the first connection. The HWD 302 may be configured to select the active HWD RFIC 306 and beam 312 based on which RFIC and beam has the highest MCS. The feedback may include data corresponding to an MCS for each of the potential beams 310-312 for the console 304 and the HWD 302.

The console 304 may be configured to identify, determine, or otherwise select an active console RFIC 308a, 308b and an active beam 310 which is to serve the channel based on the feedback from the HWD 302. The console 304 may be configured to select the active RFIC 308 and the active beam 310 based on which RFIC 308 and which beam 310 results in the highest MCS for a channel. Following selection of an RFIC 306, 308 and a beam 310, 312 which is to serve the channel between the HWD 302 and the console 304, the HWD 302 and the console 304 may be configured to transmit and receive packets therebetween during the active period 410. For instance, in the timing diagram shown in FIG. 4, the console 304 may be configured to transmit a data packet (shown as block 435). The HWD 302 may be configured to receive the data packet and transmit a corresponding data packet (shown as block 440). The console 304 may be configured to generate a follow-up data packet (shown as block 445), and the HWD 302 may be configured to receive the data packet from the console 304 and can generate another data packet (shown as block 455). The console 304 may be configured to receive the data packet from the HWD 302 and can transmit feedback back to the HWD 302 (shown as block 465). The HWD 302 and console 304 may be configured to exchange packets during the active period 410.

In some embodiments, the HWD 302 and/or console 304 (collectively referred to as device 300) may be configured to request BT. The device 300 may be configured to request BT based on an MCS of the channel between the HWD 302 and console 304. For instance, the device 300 may be configured to selectively request BT at greater intervals as the MCS decreases. As an example, where the MCS of the channel (defined by the active beams 310, 312) satisfies a first threshold (e.g., an MCS which is greater than or equal to eight, for instance), the device 300 may not request BT for any internal packets exchanged during the active period 410. The device 300 may not request BT for internal packets where the MCS is greater than the first threshold, and the total duration of the active period 410 may be less than 0.5 ms. Based on field measurements, channel conditions may change at most 1 dB per 0.5 ms. Where the MCS is greater than the first threshold and total transmission time for the active period 410 is less than or approximately 0.5 ms, the MCS may not change during the active period 410. As such, the device 300 may not request any BT for internal packets, since the power consumption for performing BT may be outweighed by any potential benefits for channel improvements.

The device 300 may request BT for a select number of packets based on the MCS where the MCS is less than the first threshold. As an example, for an MCS between four and seven, the HWD 302 may request BT in the middle of the active period 410 (e.g., with the second packet transmitted from HWD 302 to the console 304 denoted by block 440). The console 304 may be configured to perform BT along with a data packet (shown as block 445) within a training field (denoted by block 450) responsive receiving the request from the HWD 302. Similar to BT performed during the initial handshake packets described above, the training field may include a number of neighboring beams for the active beam 310 of the console 304. The HWD 302 may similarly perform BT along with a data packet (shown as block 455) within a training field (denoted by block 460). Thus, the HWD 302 and the console 304 may be configured to perform BT during exchange of a subset of data packets within the active period 410. As the MCS decreases, the device 300 may be configured to request BT for more packets. For example, where the MCS is between two and three, the device 300 may be configured to perform BT for packets illustrated by blocks 435, 440, and 465. Where the MCS is less than two, the device 300 may be configured to perform BT for each of the packets exchanged between the HWD 302 and the console 304. Accordingly, the device 300 may perform BT for more or fewer packets based on an MCS for the channel between the HWD 302 and console 304.

In each instance where the device 300 performs BT on a number of neighboring beams 310, 312 for the active beams 310, 312, where the MCS for one of the neighboring beams 310, 312 is greater than the MCS for the active beams 310, 312, the device 300 may be configured to switch from the active beams 310, 312 to the neighboring beams 310, 312 having the higher MCS. As an example, where the active beam 312(3) for the HWD 302 is used for the channel and the HWD 302 performs BT on a number of neighboring beams 312(1)-312(2) and 312(4)-312(5), and using neighboring beam 312(4) for the channel results in a higher MCS, the HWD 302 may switch from the active beam 312(3) to the neighboring beam 312(4) for serving the channel between the HWD 302 and console 304. Similarly, where the active beam 310(2) for the console 304 is used for the channel and the console 304 performs BT on a number of neighboring beams 310(1) and 310(3)-310(5), and using neighboring beam 310(3) for the channel results in a higher MCS, the console 304 may switch from the active beam 310(2) to the neighboring beam 310(3) for serving the channel between the HWD 302 and console 304. As such, the device 300 may dynamically switch between beams 310, 312 to optimize the channel conditions between the HWD 302 and console 304.

In some embodiments, during BT for internal packets during the active period, the device 300 may be configured to perform BT on a number of neighboring beams 310, 312 based on the MCS for the channel. For example, as the MCS decreases, the device 300 may be configured to increase the number of neighboring beams for which the device 300 performs BT. As one example, where the MCS is greater than eight, the device 300 may be configured to perform BT for a first number of neighboring beams (e.g., two neighboring beams), where the MCS is between seven and four, the device 300 may be configured to perform BT for a second number of neighboring beams (e.g., four neighboring beams), where the MCS is between three and two, the device 300 may be configured to perform BT for a third number of neighboring beams (e.g., eight neighboring beams), and where the MCS is less than two, the device may be configured to perform BT for a fourth number of neighboring beams (e.g., 16 neighboring beams). The device 300 may be configured to increase the number of neighboring beams 310, 312 for which to perform BT to increase the likelihood of identifying a beam 310, 312 which results a higher MCS than the MCS of the current channel. Correspondingly, the device 300 may be configured to decrease the number of neighboring beams for BT to decrease power consumption, particularly where the MCS of the current channel is satisfactory. Accordingly, the device 300 may be configured to balance between power consumption and likelihood of improved channel conditions in selecting the number of neighboring beams for which to perform BT.

Figure 5A:
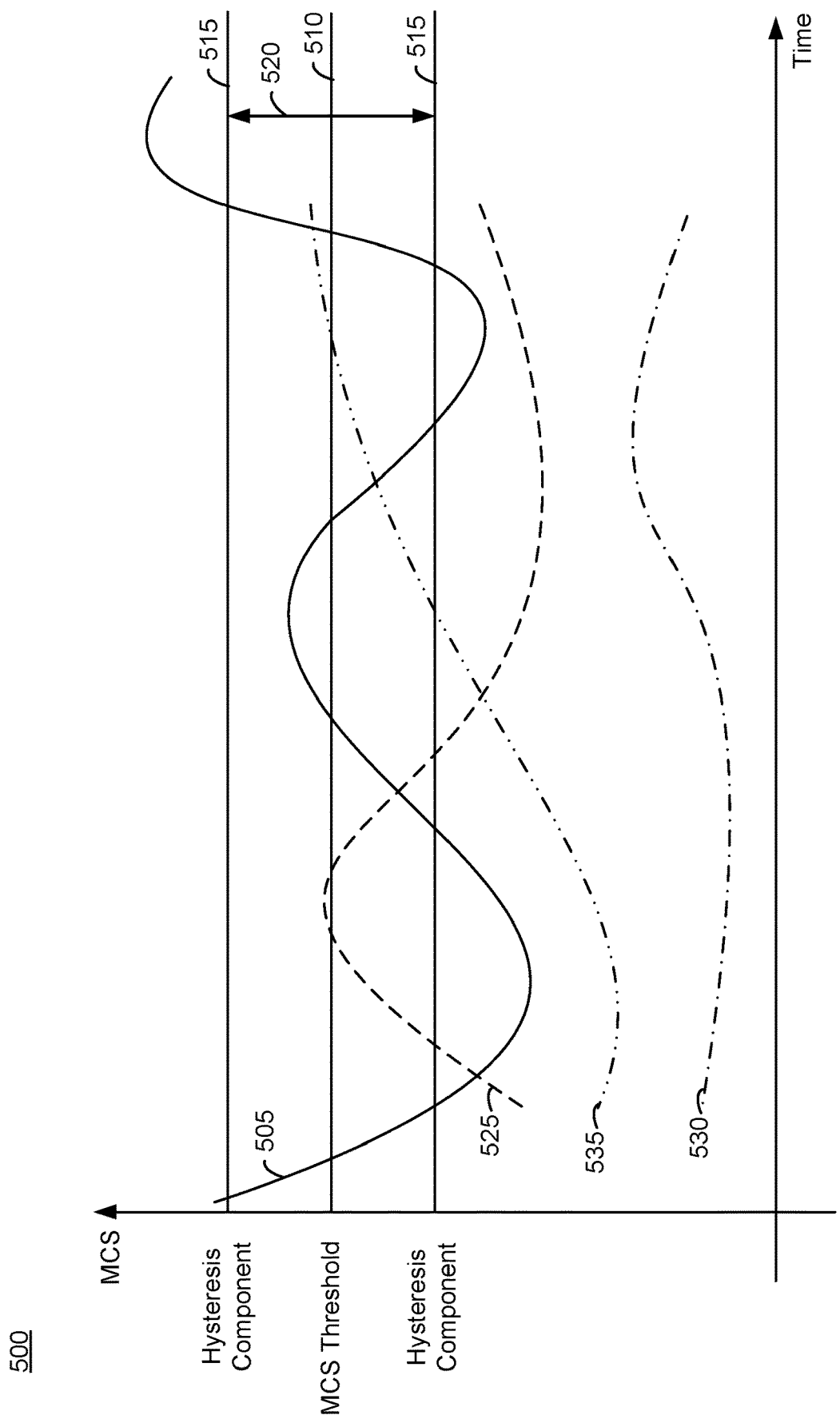
FIG. 5A though FIG. 5C are example timing diagrams showing changes between active and idle radio-frequency integrated circuits for the head mounted display and the console, according to an example implementation of the present disclosure.
Figure 5B:
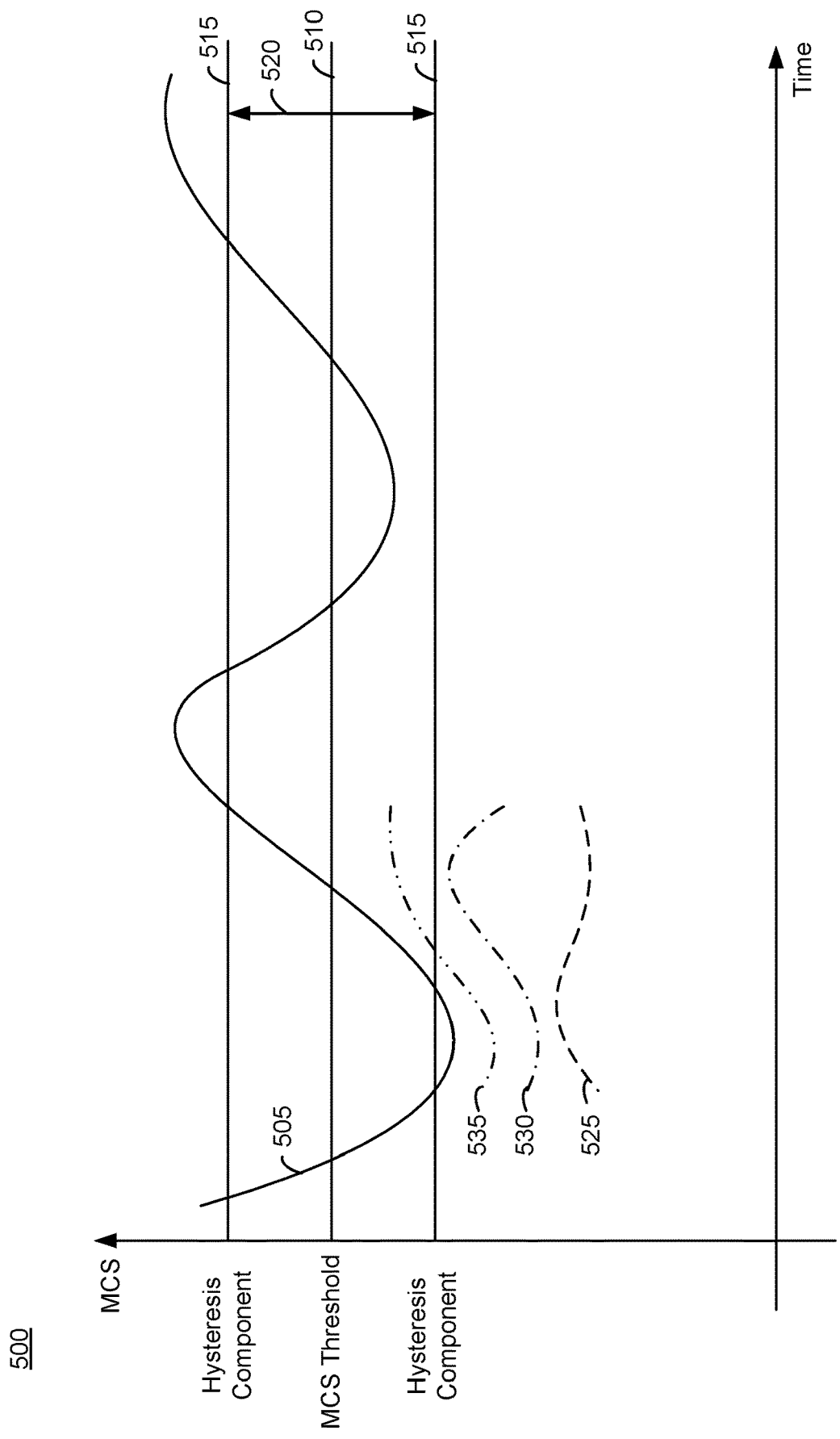
Figure 5C:
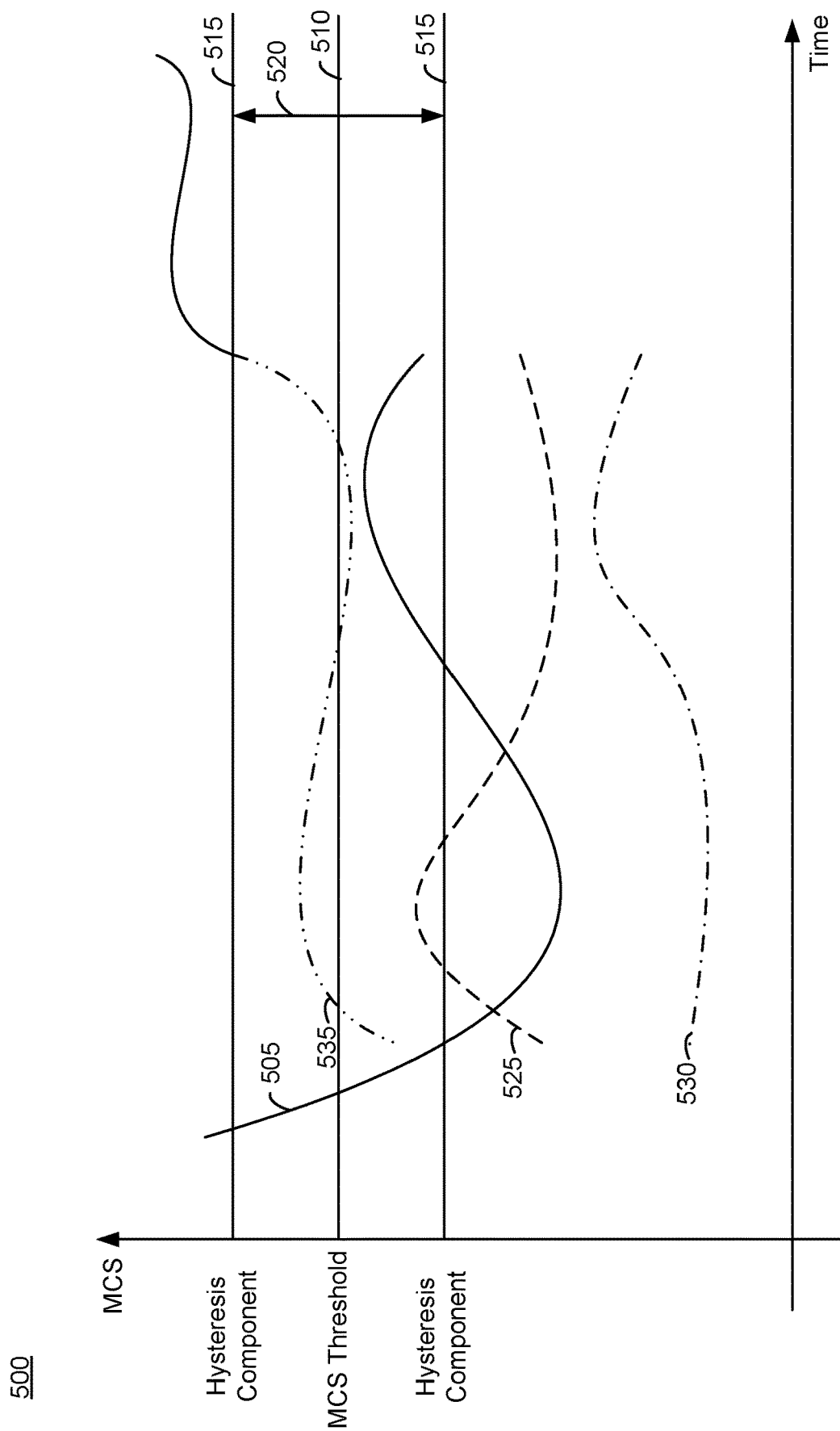

Referring to FIG. 3A-FIG. 3C and FIG. 5A-FIG. 5C, the MCS for the channel may change as the user moves the user's head and, correspondingly, the HWD 302. As described in greater detail above, the device 300 may be configured to selectively perform BT on the active RFICs 306, 308 to optimize the channel between the HWD 302 and the console 304. In some embodiments, the device 300 may be configured to selectively switch between active and idle RFICs 306, 308 to further optimize the channel between the HWD 302 and the console 304. Depicted in FIG. 5A-FIG. 5C are example timing diagrams 500 showing MCS over time of the various RFICs 306, 308. In some embodiments, the device 300 may be configured to selectively measure MCS for additional connections between idle RFICs 306, 308 based on the MCS of the first connection. In some embodiments, the device 300 may be configured to switch between active (e.g., serving) RFICs 306, 308, and idle (e.g., non-serving) RFICs 306, 308. In some embodiments, the device 300 may be configured to selectively perform MCS measurements on additional channels for the active and idle RFICs 306, 308 based on a comparison of the MCS for the current channel to an MCS threshold.

In the example timing diagrams 500 shown in FIG. 5A-FIG. 5C, the MCS 505 of the active HWD RFIC 306 and the active console RFIC 308 (e.g., the first connection defining the channel between the HWD 302 and the console 304) are shown in solid. The device 300 may be configured to determine, measure, modify, or otherwise identify the MCS 505 for the channel in real-time, during the active period, during transmission, and receipt of packets during the active period, etc. In some embodiments, the console 304 may be configured to identify the MCS 505 for the channel. In some embodiments, the HWD 302 may be configured to identify the MCS 505 for the channel. In still some embodiments, both the HWD 302 and the console 304 may be configured to identify the MCS 505 for the channel.

The device 300 (e.g., the HWD 302 and/or the console 304) may be configured to maintain, include, or otherwise access an MCS threshold 510. In some embodiments, the device 300 may be configured to access an MCS threshold 510 and a hysteresis component 515 corresponding to the MCS threshold 510. As shown in FIG. 5A through FIG. 5C, the device 300 may be configured to access a hysteresis component 515 corresponding to an MCS above the MCS threshold 510 (sometimes referred to as an upper hysteresis component 515) and a hysteresis component 515 corresponding to an MCS below the MCS threshold 510 (sometimes referred to as a lower hysteresis component 515). The upper and lower hysteresis components 515 may together form a buffer 520 corresponding to the MCS threshold 510. The MCS threshold 510 may reside in the middle of the buffer 520 defined by the upper and lower hysteresis components 515. As described in greater detail below, the device 300 may use the hysteresis components 515 to lessen a likelihood of increased power consumption by triggering MCS measurements and switching between active and idle RFICs 306, 308.

The device 300 may be configured to compare the MCS of the first connection (or channel) between the active HWD RFIC 306 and the active console RFIC 308 to the MCS threshold 510. The device 300 may be configured to perform one or more MCS measurements for a second connection (or channel) where the MCS of the first connection does not satisfy the MCS threshold 510 (e.g., the MCS of the first connection is less than the MCS threshold 510). In some embodiments, the device 300 may be configured to compare the MCS of the first connection to the lower hysteresis component 515 of the MCS threshold 510. The device 300 may be configured to perform the one or more MCS measurements for the second connection when the MCS of the first connection does not satisfy the lower hysteresis component 515 of the MCS threshold 510.

As shown in FIG. 5A, the device 300 may be configured to determine, measure, quantify, or otherwise identify an MCS of one or more second connections. In the example shown in FIG. 5A, the device 300 may be configured to identify an MCS of three connections (e.g., an MCS 525 for a connection between the active HWD RFIC 306 and the idle console RFIC 308 [shown in dash], an MCS 530 for a connection between the idle HWD RFIC 306 and the active console RFIC 308 [shown in dot-dash], and an MCS 535 for a connection between the idle HWD RFIC 306 and the idle console RFIC 308 [shown in dot-dot-dash]). While shown as identifying an MCS of three connections, it is noted that the device 300 may be configured to identify an MCS for any number of connections, which may depend on the number of RFICs 306 included in the HWD 302 and the number of RFICs 308 included in the console 304. The device 300 may be configured to identify an MCS of the one or more second connections responsive to the MCS of the first connection dropping below the lower hysteresis component 515 (as shown in FIG. 5A-FIG. 5C).

The device 300 may identify the MCS for the one or more second connections by launching, bringing up, starting, initiating, or otherwise activating one or more of the idle RFICs 306, 308. The device 300 may be configured to trigger performance of one or more protocols (e.g., SLS, BRP, and/or BT) between the active and/or idle RFIC(s) 306, 308. In some embodiments, the device may be configured to measure the MCS for the one or more second connections while the first connection (e.g., between the active RFICs 306, 308) is maintained. Accordingly, the device 300 may be configured to maintain the first connection while simultaneously searching for a better connection such that performance and user experience is not interrupted.

In some embodiments, the device 300 may be configured to perform the one or more MCS measurements for the second connection(s) at various intervals. For instance, and in some embodiments, the device 300 may be configured to perform the MCS measurements at various system intervals beginning at the time at which the MCS for the first connection falls beneath the lower hysteresis component 515 of the MCS threshold 510. In some implementations, the device 300 may be configured to perform the MCS measurements at the start of the first system interval when the MCS for the first connection falls beneath the lower hysteresis component 515 of the MCS threshold 510. The device 300 may be configured to perform additional MCS measurements for the second connection(s) at the start of subsequent system intervals. In some embodiments, a duration between two subsequent MCS measurements may increase. The duration may increase exponentially. For instance, the device 300 may perform a first MCS measurement of one or more second connections at the start of the first system interval, then perform a second MCS measurement at the start of the second system interval, then perform a second MCS measurement at the start of the fourth system interval, followed by performing a third MCS measurement at the start of the eighth system interval, and so forth. Hence, the duration between subsequent MCS measurement(s) may increase over time. In some embodiments, the duration may increase up to a maximum duration. The maximum duration may be, for instance, 16 system intervals. In other words, the duration between subsequent MCS measurements may follow the formula below:

$$\text{Timer}_{MCSMeasure(t)} = \min(2 \times \text{MCSMeasure}(t-1), \text{Max-Duration})$$

Accordingly, the device 300 may increase the duration (MCSMeasure) by two for each subsequent MCS measurement up to a maximum duration.

The device 300 may be configured to compare both the MCS for the first connection and the MCS measurements for the second connection(s) to the MCS threshold 510. In some embodiments, the device 300 may be configured to compare both the MCS for the first connection and the MCS measurements for the second connection(s), to the upper hysteresis component 515 of the MCS threshold 510. The device 300 may be configured to perform the MCS measurements for the second connection until one of the MCS for the first connection or the MCS measurements for the second connection(s) exceeds the MCS threshold 510 (or the upper hysteresis component 515 of the MCS threshold 510). The device 300 may be configured to maintain the first connection while the device 300 performs the subsequent MCS measurements for the second connection and compares those MCS measurements to the MCS threshold 510.

In FIG. 5A, an example timing diagram 500 is shown in which the MCS 505 for the first connection falls below the lower hysteresis component 515 for the MCS threshold 510 (thereby triggering the MCS measurements for the second connections), and subsequently rises above the upper hysteresis component 515 for the MCS threshold 510. When the MCS 505 for the first connection exceeds the upper hysteresis component 515 for the MCS threshold 510, the device 300 may be configured to cease, halt, stop, or otherwise not perform any subsequent MCS measurements for the second connection(s). Accordingly, the device 300 may be configured to maintain the first connection throughout the timing diagram 500 shown in FIG. 5A. It is worth noting that both MCS 525 and MCS 535 exceed the MCS threshold 510 at some point during the timing diagram 500. However, since the MCS 525, 535 does not exceed the upper hysteresis component 515 for the MCS threshold 510, and the MCS 505 for the first connection exceeds the upper hysteresis component 515 for the MCS threshold 510, the first connection is maintained.

In FIG. 5B, another example timing diagram 500 is shown which is similar to the timing diagram 500 shown in FIG. 5A. The MCS 505 for the first connection falls below the lower hysteresis component 515 for the MCS threshold 510 (thereby triggering the MCS measurements for the second connections), and subsequently rises above the upper hysteresis component 515 for the MCS threshold 510. By implementing the hysteresis components 515, when the MCS 505 of the first connection again drops below the MCS threshold 510 (but not below the lower hysteresis component 515 for the MCS threshold 510), the device 300 does not perform any subsequent MCS measurements for the second connections. However, should the MCS 505 of the first connection drop below the lower hysteresis component 515 for the MCS threshold 510, the device 300 may again perform additional MCS measurements for the second connection(s). Accordingly, the MCS threshold 510 (and the hysteresis components 515) may be adjusted, tuned, or otherwise refined to balance between triggering of performance of MCS measurements for the second connections (which increases power consumption) and maintaining the idle state of RFICs 306, 308 (which reduces power consumption).

In FIG. 5C, another example timing diagram 500 is shown which is similar to the timing diagram 500 shown in FIG. 5A. The MCS 505 for the first connection falls below the lower hysteresis component 515 for the MCS threshold 510 (thereby triggering the MCS measurements for the second connections). As shown in FIG. 5C, the MCS 535 subsequently rises above the upper hysteresis component 515 for the MCS threshold 510. The device 300 may be configured to switch from the first connection to the second connection corresponding to MCS 535 responsive to the MCS 535 exceeding the upper hysteresis component 515 for the MCS threshold 510. The device 300 may be configured to cease, halt, stop, or otherwise not perform any subsequent MCS measurements for the first connection and the other second connection(s) once the device 300 switches to the second connection corresponding to MCS 535.

While described as a comparison between the MCS 505, 525, 530, 535 to the upper hysteresis component 515, in some implementations, the device 300 may be configured to compare the MCS 525-535 for the second connection(s) to the MCS 505 for the first connection, and switch to one of the second connections where the corresponding MCS 525-535 exceeds the MCS 505 for the first connection. For example, continuing the example timing diagram 500 shown in FIG. 5A, the device 300 may be configured to switch from the first connection to the second connection corresponding to MCS 525 after the MCS 505 of the first connection falls below the lower hysteresis component 515 of the MCS threshold 510 (since the MCS 525 is greater than the MCS 505). Subsequently, the MCS 525 falls below the lower hysteresis component 515 of the MCS threshold 510, at which point the device 300 may be configured to switch back to the first connection (since the MCS 505 for the first connection is again greater than both the MCS 525 and the MCS 535 of the second connections). Subsequently, the MCS 505 again falls below the lower hysteresis component 515 of the MCS threshold 510, at which point the device 300 may be configured to switch to the second connection corresponding to MCS 535.

Furthermore, in implementations in which the device 300 does not implement the hysteresis components 515, the device 300 may be configured to maintain the first connection (or switch to a second connection) when one of the MCS 505, 525-535 exceeds the MCS threshold 510. For example, continuing the example timing diagram 500 shown in FIG. 5A, the device 300 may be configured to switch from the first connection to the second connection corresponding to MCS 525 after the MCS 505 of the first connection falls below the MCS threshold 510 (since the MCS 525 for the second connection is the next connection to exceed the MCS threshold 510). Subsequently, the MCS 525 falls below the MCS threshold 510, at which point the device 300 may be configured to switch back to the first connection (since the MCS 505 for the first connection is the next connection to exceed the MCS threshold 510). Subsequently, the MCS 505 again falls below the MCS threshold 510, at which point the device 300 may be configured to switch to the second connection corresponding to MCS 535 (since the MCS 535 for the second connection is the next connection to exceed the MCS threshold 510).

Such implementations may result in additional performances of MCS measurements and switching between active and idle RFICs 306, 308, which increases power consumption, but may result in stronger channel conditions between the HWD 302 and console 304.

Figure 6:
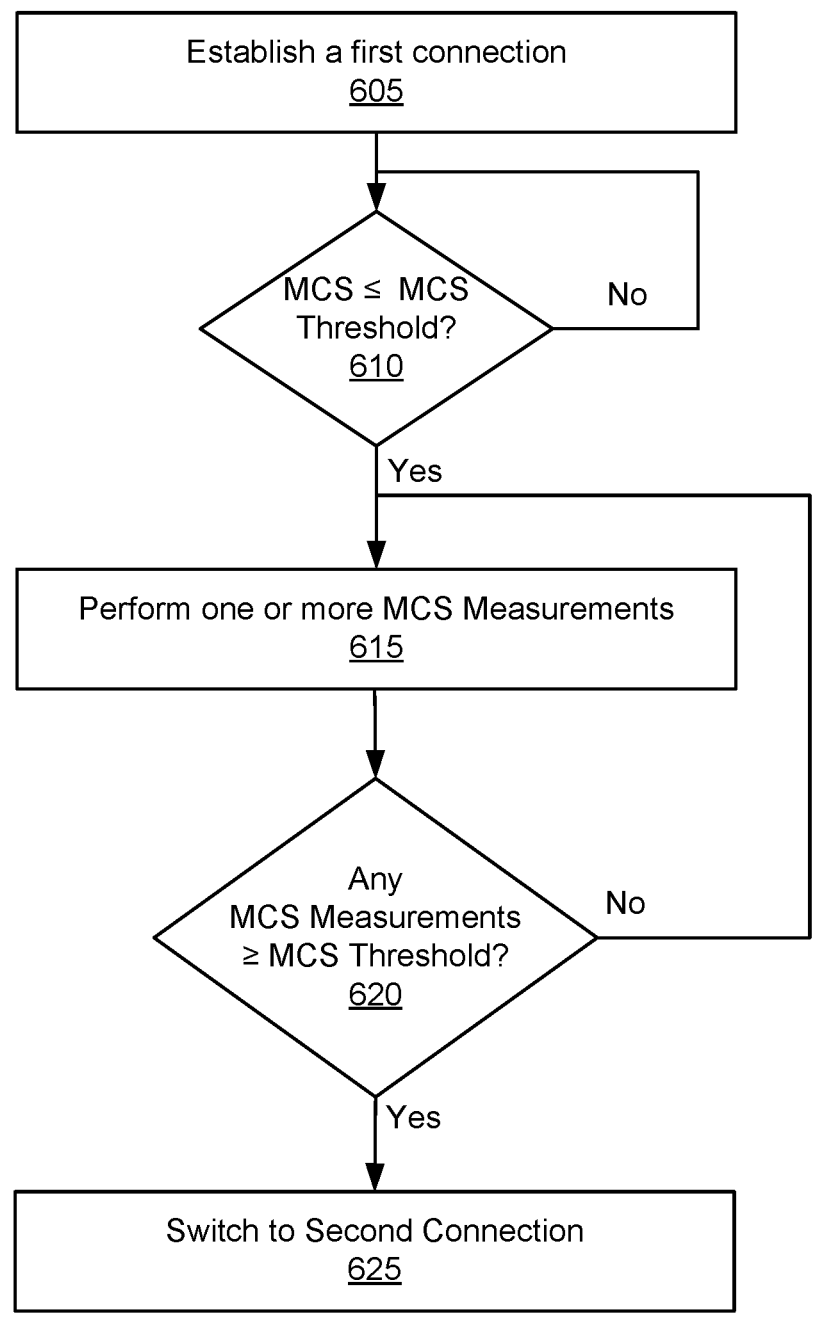
FIG. 6 shows an example process of beamforming, according to an example implementation of the present disclosure.

FIG. 6 shows an example process 600 of multi-level multi-RFIC beamforming, according to an example implementation of the present disclosure. The process 600 may be performed by the components described above with reference to FIG. 1-FIG. 3C including, for instance, the device 300 which may include the HWD 302 and/or the console 304. In some embodiments, the process 600 includes more, fewer, or different steps than shown in FIG. 6. For example, in some embodiments, two or more of the steps may be performed in any combination, and some steps may be performed at substantially the same time. As a brief overview, at step 605, the device 300 establishes a first connection. At step 610, the device compares an MCS of the first connection to an MCS threshold. At step 615, the device performs one or more MCS measurements. At step 620, the device compares the MCS measurements to the MCS threshold. At step 625, the device 300 switches to the second connection.

At step 605, and in some embodiments, the device 300 establishes a first connection. In some embodiments, the device 300 establishes a first connection between an active (e.g., serving the first connection) HWD radio-frequency integrated circuit (RFIC) 306 and an active console RFIC 308. The device 300 may be or include the HWD 302 and/or the console 304. The device 300 may establish the first connection by performing a handshake between the HWD 302 and the console 304. The handshake may include performing a segment level sweep (SLS) and/or a beam refinement protocol (BRP). The device 300 may establish the first connection based on a modulation and coding scheme (MCS) corresponding to a plurality of beams for the HWD 302 (e.g., for the active HWD RFIC 306 of the HWD 302) and a plurality of beams for the console 304 (e.g., for the active console RFIC 308 of the console 304). The device may establish the first beam based on which of the plurality of beams for the HWD 302 and console 304 result in the highest MCS for a connection. The first connection may be defined by an active beam for the HWD 302 and an active beam for the console 304.

In some embodiments, the first connection may include a first beam of the device 300. The first beam may be the active beam from the HWD 302 toward the console 304. The first beam may be the active beam from the console 304 toward the HWD 302. In some embodiments, the device 300 may perform BT for one or more neighboring beams for one of the active beams. In some embodiments, the device 300 may perform BT for one or more neighboring beams according to the MCS of the first connection. For example, the device 300 may perform BT for one or more neighboring beams at an increased rate or frequency (e.g., within an active period of a system interval) as the MCS decreases. In some embodiments, the device 300 may perform BT for an increased number of neighboring beams based on the MCS of the first connection. For instance, the device 300 may perform BT for a first number of neighboring beams in response to a first MCS of the first connection, and perform BT for a second number of neighboring beams (e.g., greater than the first number) in response to a second MCS of the first connection (greater than the first MCS). Accordingly, the device 300 may increase the number of neighboring beams for which to perform BT as the MCS of the first connection decreases.

At step 610, and in some embodiments, the device 300 compares an MCS of the first connection to an MCS threshold. In some embodiments, the device 300 may compare the MCS of the first connection to a hysteresis component corresponding to the MCS threshold. The device 300 may compare the MCS of the first connection to a lower hysteresis component corresponding to the MCS threshold. As shown in FIG. 6, where the MCS of the first connection satisfies the MCS threshold (e.g., is greater than or equal to the MCS threshold), the process 600 may loop back to step 610. Hence, the device 300 may monitor the MCS of the first connection and compare the MCS to the MCS threshold.

The device 300 may monitor the MCS of the first connection at various intervals (e.g., continuously, during the active period of a system interval, during transmission or receipt of packets exchanged during the active period, etc.). Where the MCS of the first connection does not satisfy the MCS threshold (e.g., is less than the MCS threshold), the process 600 may proceed to step 615.

At step 615, and in some embodiments, the device 300 performs one or more MCS measurements. In some embodiments, the device 300 may perform one or more MCS measurements for a second connection while the first connection is maintained. The second connection may be a connection between at least one of an idle HWD RFIC 306 or an idle console RFIC 308. For instance, the second connection(s) may each be between the active HWD RFIC 306 and the idle console RFIC 308, the idle HWD RFIC 306 and the active console RFIC 308, or the idle HWD RFIC 306 and the idle console RFIC 308. In some embodiments, the device may perform MCS measurements for each potential second connection (e.g., between the active and idle RFICs 306, 308). The device 300 may perform MCS measurements by initiating (or causing initiating of) connections between the active and idle RFICs 306, 308, performing one or more beamforming protocols (e.g., BRP, BT, and/or segment level sweep (SLS)), and determining an MCS of those connections.

In some embodiments, the device 300 may perform MCS measurements at various intervals. The device 300 may perform a first MCS measurement (or set of MCS measurements), a second MCS measurement (or set of MCS measurements), a third MCS measurement (or set of MCS measurements), and so forth. In some embodiments, the device 300 may perform each MCS measurement (or set of MCS measurements) at the start (or during) a system interval. In some embodiments, a duration or time between subsequent MCS measurements may increase. The duration may increase exponentially (e.g., at the start of a first system interval, a second system interval, a fourth system interval, an eighth system interval, etc.). In some embodiments, the duration may increase to a maximum duration.

At step 620, and in some embodiments, the device 300 compares the MCS measurements to the MCS threshold. In some embodiments, the device 300 compares the MCS measurements of the second connection(s) and the MCS for the first connection to the MCS threshold. The MCS threshold may be the same as the MCS threshold used at step 610. In some embodiments, the device 300 may compare the MCS measurements to a hysteresis component of the MCS threshold. The hysteresis component of the MCS threshold may be an upper hysteresis component of the MCS threshold. Where each of the MCS for the first connection and the MCS measurements of the second connection(s) are less than the MCS threshold (or the upper hysteresis component of the MCS threshold), the process 600 may loop back to step 615. The device 300 may perform MCS measurements for the second connection until the MCS of the first connection or one of the MCS measurements for the second connection(s) exceed the hysteresis component above the MCS threshold. Hence, the device 300 may maintain the first connection when the MCS measurements performed at step 615 are below the hysteresis component of the MCS threshold.

At step 625, and in some embodiments, the device 300 switches to the second connection. In some embodiments, the device 300 may switch to the second connection when at least one of the one or more MCS measurements satisfies the MCS threshold. In some embodiments, the device 300 may switch to the second connection when at least one of the one or more MCS measurements exceeds the MCS of the first connection. Where the device 300 performs MCS measurements for a plurality of connections (e.g., at step 615), the device 300 may switch to one of the connections when the MCS measurement for that connection satisfies the MCS threshold. In some embodiments, the device 300 may switch to the second connection when the MCS measurement exceeds a hysteresis component above the MCS threshold (and/or being above the MCS of the first connection). The device 300 may not perform subsequent MCS measurements for any other connections (or the first connection) when the device 300 switches to the second connection as a result of the corresponding MCS exceeding the MCS threshold (and/or being greater than the MCS of the first connection). The device 300 may not perform any subsequent MCS measurements unless and until the MCS of the second connection falls below the MCS threshold (at which point the process 600 proceeds according to step 615).

C. Computing System

Figure 7:
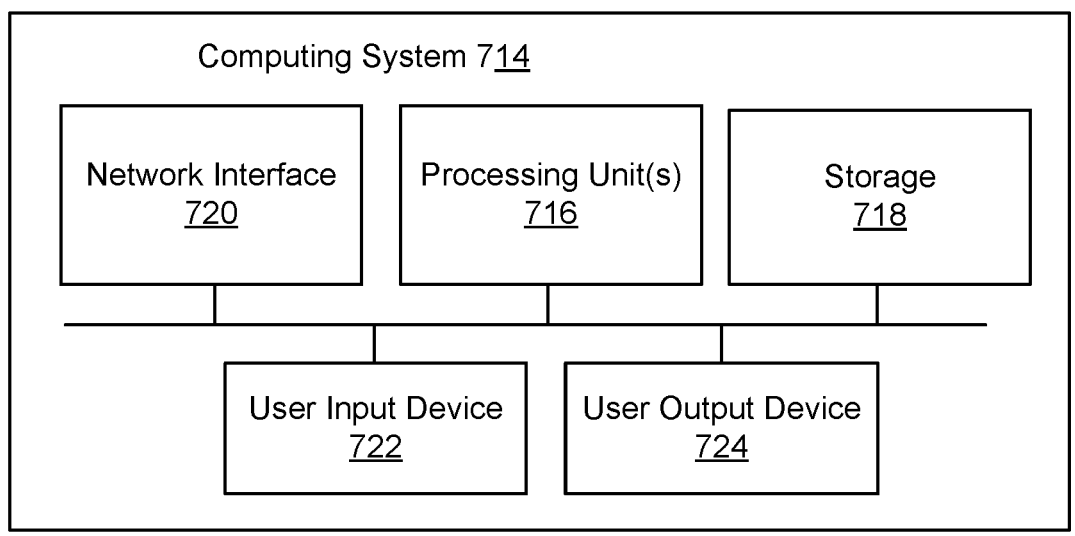
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 714 can be implemented to provide VR, AR, or MR experiences. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/-10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    establishing, by a device comprising at least one of a head wearable display (HWD) or a console, a first connection between an active HWD radio-frequency integrated circuit (RFIC) and an active console RFIC, the HWD comprising the active HWD RFIC and an idle HWD RFIC, and the console comprising the active console RFIC and an idle console RFIC;
    comparing, by the device, a modulation and coding scheme (MCS) of the first connection to an MCS threshold;
    performing, by the device in response to the measured MCS not satisfying the MCS threshold, one or more MCS measurements for a second connection of at least one of the idle HWD RFIC or the idle console RFIC, while the first connection is maintained;
    comparing, by the device, the one or more MCS measurements of the second connection to the MCS threshold; and
    switching, by the device, to the second connection when at least one of the one or more MCS measurements exceeds at least one of: the MCS threshold or the MCS of the first connection.

2. The method of claim 1, comprising switching, by the device, to the second connection when the at least one MCS measurement of the second connection exceeds a hysteresis component above at least one of: the MCS threshold or the MCS of the first connection.

3. The method of claim 1, wherein the second connection is between one of:
    the active HWD RFIC and the idle console RFIC;
    the idle HWD RFIC and the active console RFIC; or
    the idle HWD RFIC and the idle console RFIC.

4. The method of claim 1, wherein the one or more MCS measurements are performed until the MCS of the first connection exceeds a hysteresis component above the MCS threshold or until the device switches to the second connection.

5. The method of claim 4, further comprising maintaining, by the device, the first connection when the one or more MCS measurements are below the hysteresis component.

6. The method of claim 1, wherein a duration between subsequent ones of the one or more MCS measurements increases.

7. The method of claim 1, wherein the first connection uses a first beam of the device, the method further comprising:
    performing, by the device according to the MCS of the first connection, beam tracking for one or more neighboring beams of the first beam.

8. The method of claim 7, further comprising:
switching, by the device, from the first beam to a neighboring beam of the one or more neighboring beams in response to a measured MCS corresponding to the neighboring beam being greater than the MCS of the first connection.

9. The method of claim 7, comprising performing beam tracking for a first number of the one or more neighboring beams in response to a first MCS of the first connection, and performing beam tracking for a second number of the one or more neighboring beams in response to a second MCS of the first connection.

10. The method of claim 9, wherein the first MCS is greater than the second MCS, and the first number is less than the second number.

11. A system, comprising:
a device comprising at least one of a head wearable display (HWD) or a console, the HWD comprising an active HWD radio-frequency integrated circuit (RFIC) and an idle RFIC, the console comprising an active console RFIC and an idle console RFIC, wherein the device is configured to:
establish a first connection between the active HWD radio-frequency integrated circuit (RFIC) and the active console RFIC;
compare a modulation and coding scheme (MCS) of the first connection to an MCS threshold;
perform, in response to the measured MCS not satisfying the MCS threshold, one or more MCS measurements for a second connection of at least one of the idle HWD RFIC or the idle console RFIC, while the first connection is maintained;
compare the one or more MCS measurements of the second connection to the MCS threshold; and
switch to the second connection when at least one of the one or more MCS measurements exceeds at least one of: the MCS threshold or the MCS of the first connection.

12. The system of claim 11, wherein the device is further configured to switch to the second connection when the at least one MCS measurement of the second connection exceeds a hysteresis component above at least one of: the MCS threshold or the MCS of the first connection.

13. The system of claim 11, wherein the second connection is between one of:
the active HWD RFIC and the idle console RFIC;
the idle HWD RFIC and the active console RFIC; or
the idle HWD RFIC and the idle console RFIC.

14. The system of claim 11, wherein the one or more MCS measurements are performed until the MCS of the first connection exceeds a hysteresis component above the MCS threshold or until the device switches to the second connection.

15. The system of claim 14, wherein the device is further configured to maintain the first connection when the one or more MCS measurements are below the hysteresis component.

16. The system of claim 11, wherein a duration between subsequent ones of the one or more MCS measurements increases.

17. The system of claim 11, wherein the first connection uses a first beam of the device, the device further configured to:
perform, according to the MCS of the first connection, beam tracking for one or more neighboring beams of the first beam.

18. The system of claim 17, wherein the device is further configured to:
switch from the first beam to a neighboring beam of the one or more neighboring beams in response to a measured MCS corresponding to the neighboring beam being greater than the MCS of the first connection.

19. The system of claim 17, wherein the device is configured to perform beam tracking for a first number of the one or more neighboring beams in response to a first MCS of the first connection, and perform beam tracking for a second number of the one or more neighboring beams in response to a second MCS of the first connection, and wherein the first MCS is greater than the second MCS, and the first number is less than the second number.

20. A non-transitory computer readable medium storing program instructions for causing one or more processors to:
establish, at a device comprising at least one of a head wearable display (HWD) or a console, a first connection between an active HWD radio-frequency integrated circuit (RFIC) and an active console RFIC, the HWD comprising the active HWD RFIC and an idle HWD RFIC, and the console comprising the active console RFIC and an idle console RFIC;
compare, at the device, a modulation and coding scheme (MCS) of the first connection to an MCS threshold;
perform, at the device in response to the measured MCS not satisfying the MCS threshold, one or more MCS measurements for a second connection of at least one of the idle HWD RFIC or the idle console RFIC, while the first connection is maintained;
compare, at the device, the one or more MCS measurements of the second connection to the MCS threshold; and
switch, at the device, to the second connection when at least one of the one or more MCS measurements exceeds at least one of: the MCS threshold or the MCS of the first connection.

* * * * *